Figure 1:
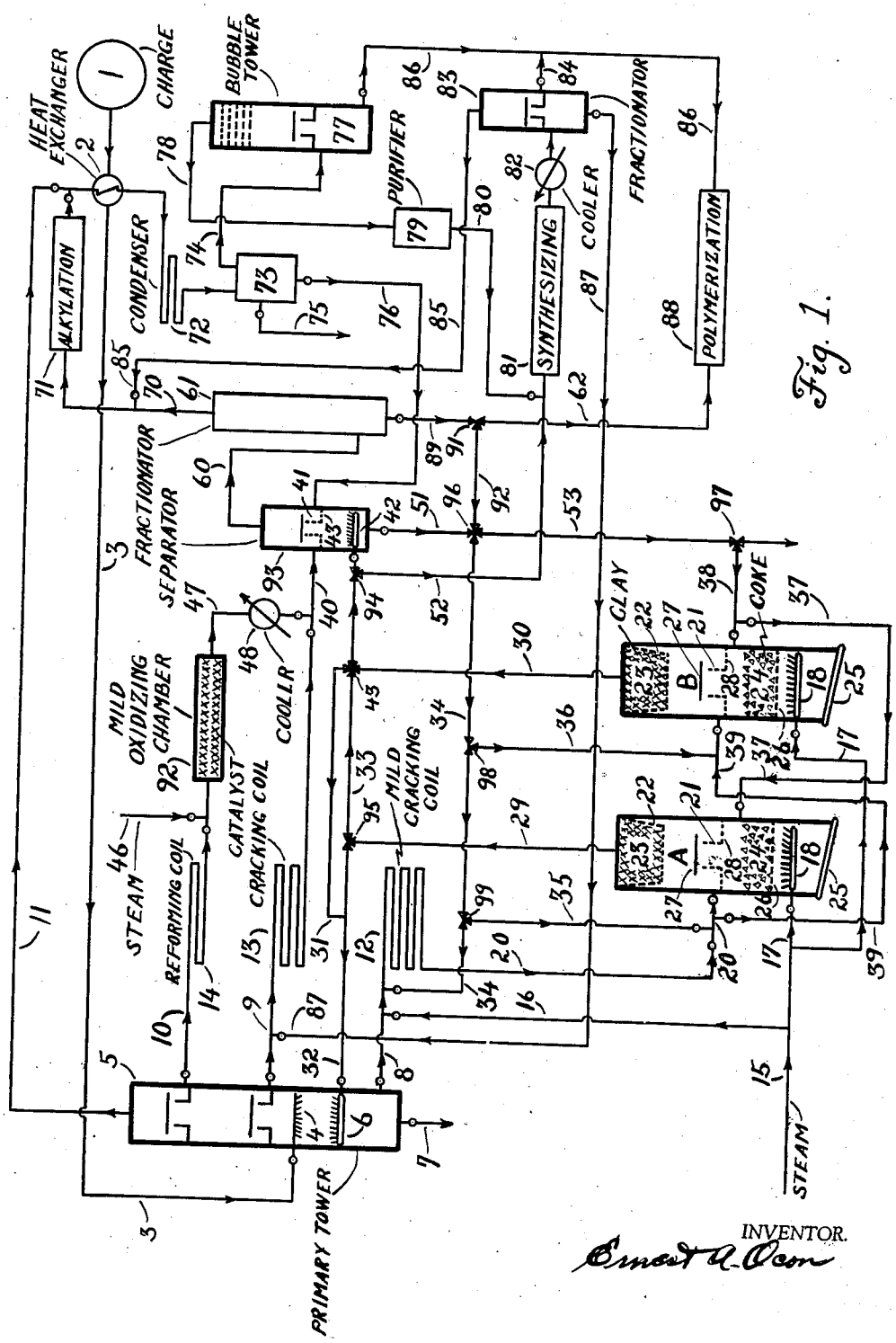

April 18, 1939.  E. A. OCON  2,154,820
PROCESS FOR REFINING HYDROCARBON OILS AND DERIVATIVES
Filed March 11, 1937   2 Sheets-Sheet 2
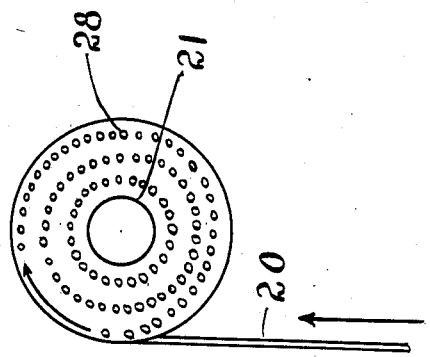
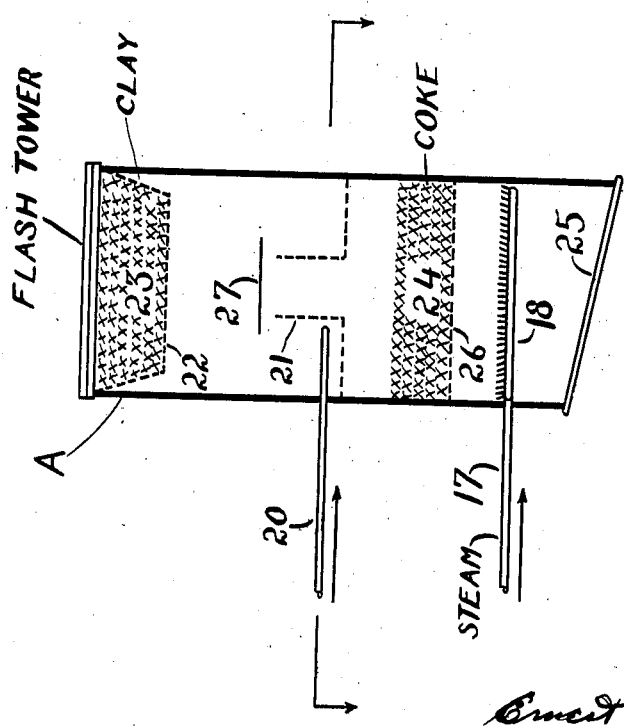
INVENTOR.
Ernest A. Ocon Patented Apr. 18, 1939

2,154,820

UNITED STATES PATENT OFFICE 2,154,820

PROCESS FOR REFINING HYDROCARBON OILS AND DERIVATIVES

Ernest A. Ocon, New York, N. Y.

Application March 11, 1937, Serial No. 130,227

12 Claims. (Cl. 196—52)

This invention relates to heat treatments of bituminous liquids, such as mineral oils, and oxygenated derivatives of the less useful products to recover mainly commercial products such as anti-knock motor fuel and lubricants with a minimum of waste combustion products, and with economy in materials and apparatus.

An object of this invention is to make possible an efficient cracking of a large proportion of the bituminous liquids as clean distillates, which can be subjected to cracking conditions without much coke formation through the aid of an efficiently formed heating agent, non-oxidizing heat carrier gases, and a contact mass in recovering a larger amount of clean distillates from bituminous liquids, while, at the same time, eliminating inefficient means for supplying heat to the heaviest portions of the bituminous liquids. More specifically, use is made of steam and mild oxidizing reactions to recover a larger portion of the initial bituminous liquids as vapors and gaseous products containing high heat energy, and the gaseous products are treated in a way to increase and enhance the products from the cracking of the bituminous distillates.

According to this invention, together with the formation of heat energy from chemical reactions, a recovery is made of additional useful hydrocarbon products by the use of synthesis reactions which make use of the oxygenated products which according to the invention described, are of material value in the alkylation zone, the quenching zone, etc., and which synthesis reactions are very handily provided with reactants from the regeneration of the filtering contact mass used in filtering the distilled residual vapors.

The process will be described by reference to the accompanying drawings, which diagrammatically illustrate the conventional apparatus involved.

In Figure 1 is shown diagrammatically the means for performing the combined operations.

In Figure 2 is shown more specifically the arrangements in the chambers in which the residual products of the bituminous liquids are treated to release additional vapors and gaseous products.

In Figure 3 is shown a cross sectional view of Figure 2.

The charging stock of the bituminous liquids, such as crude petroleum oil or topped crude, as from storage 1, is passed through a heat exchanger 2 and by line 3 into the primary flash tower 5. This initial oil or charge can be preheated to below cracking temperatures or at incipient cracking temperatures in the heat exchanger 2 and other heat exchange units. The preheated charge is injected into the tower 5 by means of a spray device 4, and is subjected to a blast of heated vapors injected through spray device 6, which heated vapors aid in the vaporization of the charge oil. The vapors arising from the vaporization may then be subjected to fractionation to form one or a plurality of distillates for cracking and reforming, such as distillates which may be withdrawn by valved lines 9 and 10. A portion of the unvaporized and condensed products formed in the vaporizing zone of tower 5 are withdrawn by valved line 8 to be passed in heated condition to a flash tower, such as A or B, preferably through a mild heating coil 12 together with superheated steam or other hydrogenous or non-oxidizing gases, such as hydrogen, normally gaseous paraffin hydrocarbons, steam admixed with reducing gas, carbon monoxide, water gas, producer gas, or inert gases such as nitrogen led in by line 15 and valved line 16.

A plurality of flash treating chambers such as A and B are provided for the distillation of residual oils so that while one of these chambers is being used for distilling the residuals to obtain purified vapors, another may be subjected to a regeneration for removing adsorbed tarry material from the contact mass. During the distillation run in any of such flash distillation chambers some superheated steam may be added to the residual oil heating coil 12 through line 16, and another amount may be added to the 35 bottom of the distilling chamber by means of spray device 18, the total amount of steam being used being limited to be about 10% by weight of the oil distilled or less. Residual oil passed through line 51 from the separator zone 93 and/or 40 reflux passed through line 89 from fractionator 61 may be added by means of lines 92 and 34 to the residuals from tower 5 passing to coil 12 through line 8 or be added to the lower part of tower A or B by lines 51, 92, 53, 38 or 37. For 45 simplification, three-way valves are shown at 99, 98, 97, 96, 95, 94, 91 and 43 for directing the materials as desired.

In Figures 2 and 3 are shown more detailed views of the construction of the flash distillation 50 chamber, such as A or B, and a cross-sectional view and plan view above the base of the pan 21.

It is to be understood that the contact mass shown to be located in a basket in the upper parts of the distillation flash chambers may be located 55 in separate chambers connected with the flash distillation chambers, and that each of such contact mass chambers may be provided with means for effecting regeneration of the contact mass separately from the distillation chambers.

The oils are flashed alternately into tower A or B by means of line 20 or valved line 37 to a pool of liquids on tray 21, into which they pass tangentially to form a swirling movement. Tray 21 has perforations 28 at the bottom for egress or ingress of materials. Above tray 21 is located baffle plate 27 for knocking out tar particles. Below is a grate 26 which may support a coke bed 24. Below coke grate 24 is situated a steam jet 18 into which passes steam from line 15 or junction 17. The bottoms of towers A or B may be fitted with removable parts 25 to enable removal of coke. In the upper parts of the towers A and B are provided contact masses 23 for eliminating tarry and other coke forming substances deleterious in pipe stills, said masses being supported by baskets 22. The contact masses may be activated clay, charcoal, broken brick, unglazed clay rings, brick fragments, bauxite, pumice, coke, or other adsorbing mass, which mass may also be coated with metallic or metal oxide catalysts. When towers A or B receive the heated residual oils from coil 12 the vapors pass through line 29 or 30 to line 32 or 33 to be introduced into the primary flash tower 5 through spray device 6 to form a blast to aid in the vaporization of the charge oil injected through spray 4.

An intermediate condensate of the nature of gas oil is withdrawn from tower 5 by valved line 9 to be cracked in coil 13 at a temperature of about 800 to 950° F., to be subjected under cracking conditions of temperature and pressure for a period of 1 to 5 minutes with less time as the temperature is increased. A lighter distillate may be withdrawn from tower 5 by valved line 10 to be subjected to reforming as in heating tube 14 and a catalytic chamber 92 into which may be injected a mild oxidizing agent such as steam by line 46. Chamber 92 contains a mild oxidizing catalyst such as oxides of metals in groups 3, 4, 5 and 8 of the periodic system such as copper oxide, chromium oxides, titanium oxide, manganous oxide, tungsten trioxide, vanadium oxides, germanium oxide, silica, chromium sesquioxide, cerium oxide, zeolites containing metals of these groups substituted for the alkali or alkaline earth metals or other oxides which retain oxygen to the same extent and the space velocity should be of the order of 10,800 to 600 cu. ft. per hour per cu. ft. of catalyst. Suitable temperatures are from 500° to 900° F. Products from the mild oxidizing chamber 92 are passed through line 47 to cooler 48 under pressure, and thence jointly with the products from cracking coil 13 are passed through line 40 to separation zone 93, passing into a midsection where a pool of oil is collected on tray 41 perforated with holes 43. Beneath tray 41 is a spray device 42 for injecting gaseous products from towers A or B passed through lines 29, 30 and 33, especially when either of these is undergoing regeneration and producing mainly water gas. Vapor products are led from the separator 93 by line 60 to fractionator tower 61 in which liquids higher boiling than gasoline components are condensed.

Fractionated vapors from 61 are passed by line 70 through a catalytic alkylation zone 71, thence being joined by overhead vapors led by line 11 from tower 5 pass through heat exchanger 2 to coil 72 for condensation. Products of condensation from 72 are received in 73 whence motor fuel liquids are decanted by line 75. Uncondensed products from 73 pass through line 74 to bubble tower 77 to be separated into gases and liquids. Gases passing overhead from 77 comprising carbon monoxide, hydrogen, methane, etc. are withdrawn by line 78, and may be passed through a purifier 79 provided with a reagent for removing sulphurous and carbon dioxide components, such as calcium oxide. The purified gases from 79 are led by line 80 to synthesizing zone 81 in which they may be joined with water gas or products passed through line 33 and 52 from partial combustion in the regeneration of towers A or B. Synthesizing zone 81 is provided with a catalyst such as iron or cobalt activated by a weak alkaline oxide, e. g. zinc oxide, or chromic oxide or an alkaline carbonate, cobalt-copper-manganese, which aid in the formation of hydrocarbons. Temperatures of the order of 450 to 600° F., and pressures of about 5 atmospheres and above can be used. The duration or time is controlled to produce the desired types of products.

Any suitable carrier may be used such as magnesia, pumice, diatomaceous earth. Temperatures of about 400° F., pressures of about 10 atmospheres or more and a rate of flow of about 40 litres per hours may be used. In place of iron, nickel gauze etched by alkaline zinc oxide may be used. Products from the synthesizing zone are passed to a fractionator 83 and may be previously cooled in a cooler 82. The products in 83 are fractionated into an overhead comprising mainly lower alcohols and led out by line 85. Heavy unvaporized synthetic hydrocarbons comprising higher aliphatics may be led by line 87 to be joined with distillate from the primary tower 5 to be cracked as in cracking coil 13. Overhead vapors from 83 may be led to join vapors from 61 passing into alkylation zone 71 to aid in the alkylation. Catalysts which bring about the formation of free radicals, e. g., methyl radicals may be used, such as zinc-chromium, zinc oxide chromates, etc., or catalysts also which aid in forming unsaturated hydrocarbons from the oxygenated hydrocarbons by dehydration, e. g., alumina, thoria or silica may be used. These reactions increase and enhance the products while acting to absorb heat.

An intermediate reflux passed through line 84 from 83 may be joined with bottoms of tower 77 withdrawn through line 86 to be used in forming lubricating oil by catalytic polymerization in 88. Reflux passed through line 62 from 61 containing aromatics may also be used in 88 to be subjected to an alkylation.

In separator 73 aqueous condensate solution containing alcohols are passed by line 76 to mix with cracked products entering the separator 93.

Residuals from separator 93 and reflux from 61 may be joined by line 92 and 34 with residuals from the primary tower 5 entering coil 12 or may be by-passed by lines 35 and 36 to the tower A or B on stream for the vaporization of residual oil from tower 5. Or, residual oil from separator 93 may be passed to the lower part of tower A or B by lines 51, 53, 37 or 38 when that tower is in use to vaporize residue from tower 5.

Alternately, after either tower A or B has been used in vaporizing residual oil from tower 5 it is subjected to regeneration by the use of steam passed in through jets 18 with or without the use of other oxidizing agent under conditions to produce mainly carbon monoxide and hydrogen, at about 1000° C. or less in the coke bed.

When coke is used in towers A and B, it may be replenished after each regeneration. Air or oxygen may be led into the bases of these towers to increase the temperatures during the regeneration.

The exact sizes of apparatus and conditions depend upon the capacity of the plant, the character of the charging stock, and types of products desired. Instruments, valves, pumps, and other such engineering equipment are not all mentioned, but it is understood that they will be used as required and as understood in the art.

It will be understood that the above examples and illustrations are not to be considered as limitations on the principles of the invention set forth.

Having described my invention, what I claim and desire to secure by Letters Patent, is as follows:

1. A process for treating bituminous oil, which comprises injecting preheated bituminous oil into a flash zone to vaporize a substantial portion of the oil, passing hot vapors into the flash zone to increase the vaporization of the oil, subjecting a portion of the resulting residues from the oil to a steam distillation under substantially cracking conditions, filtering vapor products of said steam distillation through an adsorbent contact mass capable of eliminating deleterious coke forming substances, and using thus filtered vapors as said hot vapors in the flash zone to increase the vaporization of the bituminous oil.

2. A process for treating crude petroleum oils, which comprises injecting a heated crude oil into a flash zone to vaporize a substantial portion of the oil, passing hot vapors into the flash zone to increase the amount of vapors, subjecting a portion of resultant residues from the flash zone to distillation in the presence of a non-oxidizing gaseous agent, filtering vapors from the residue distillation through an adsorbent contact mass to eliminate deleterious coke forming substances, and using thus filtered vapors as said hot vapors in the flash zone to increase the amount of vapors.

3. A process for treating bituminous oil and derivatives, which comprises subjecting a bituminous oil to cracking to form gasoline vapors, passing a gas composed largely of carbon monoxide and hydrogen into hot products of the cracking to help release vapors, separating gases and vapors from liquid products of the cracking, passing the separated gases and vapors to a catalytic alkylation zone where vapor products of the cracking are subjected to an alkylation, fractionating products from the alkylation zone to recover condensates and a gaseous material largely composed of carbon monoxide and hydrogen, subjecting such gaseous material to a synthesizing hydrogenation of the carbon monoxide to form oxygenated hydrocarbon derivatives and hydrocarbons, fractionating the synthesized products to obtain a gaseous mixture containing lower alcohols and hydrocarbons, and using such gaseous mixture in the alkylation.

4. A process for treating hydrocarbon oils and derivatives, which comprises subjecting oils to cracking under conditions to produce lower boiling products and tarry substances, separating vapors from tarry substances thus produced, filtering the vapors through an adsorbent contact mass upon which tarry substances become deposited, subjecting such tarry substances to oxidation under conditions adequate to produce a gaseous mixture containing carbon monoxide and hydrogen, subjecting carbon monoxide and hydrogen from the gaseous mixture to a synthesizing reaction to produce hydrocarbons and oxygenated hydrocarbon derivatives, and reacting such products of the synthesis with lower boiling products from the cracking in the presence of a catalyst to cause alkylation of the products from the cracking.

5. A process for treating hydrocarbon oils and derivatives, which comprises subjecting a hydrocarbon oil to cracking to form gasoline vapors, separating liquids higher boiling than gasoline from vapor products of the cracking, subjecting such vapor products to a catalytic alkylation in the vapor phase with a catalyst capable of decomposing oxygenated and hydrocarbon derivatives, fractionating products of the alkylation to recover condensates and gaseous material composed largely of carbon monoxide and hydrogen, subjecting such gaseous material to a synthesizing hydrogenation of carbon monoxide to produce oxygenated hydrocarbon derivatives and hydrocarbons, fractionating the synthesized products to obtain a gaseous mixture containing unreacted carbon monoxide, hydrogen, lower alcohols and hydrocarbons, and using such a gaseous mixture in the alkylation.

6. A process for treating bituminous oil, which comprises injecting bituminous oil into a flash zone to vaporize a substantial fraction of the oil, passing hot vapors into the flash zone to increase the vaporization of the oil, collecting a distillate from the vapors thus produced, subjecting said distillate to cracking to produce gasoline, separating liquids higher boiling than gasoline from vapor products of the cracking, subjecting thus separated liquid products of the cracking to a distillation, filtering vapors released by the distillation through an adsorbent contact mass capable of eliminating deleterious coke forming substances, and using thus filtered vapors as said hot vapors passed into the flash zone to increase the vaporization of the initial oil.

7. A process in accordance with claim 5, in which a normally gaseous fraction comprising olefins are collected as a condensate recovered from products of the alkylation and are combined with a low boiling condensate fractionated from the synthesized products, and said mixture is subjected to a polymerizing reaction to produce lubricants.

8. A process in accordance with claim 5, in which liquids higher boiling than gasoline separated from the cracked products are subjected to polymerization with olefins such as recovered in the fractionation of the alkylated products and the synthesized products.

9. A process in accordance with claim 5, in which a heaviest fraction recovered from the fractionated products of the synthesis is subjected to cracking with the hydrocarbon oil, first mentioned.

10. A process such as claimed in claim 1, in which an intermediate distillate is collected from the vaporized charging stock and hot vapors, heating said distillate to cracking conditions to produce gasoline vapors, condensing out from the cracked products vapors higher boiling than gasoline, mixing said condensate while hot with the hot steam cracked products of the residual oil, filtering the resulting vapor products of the mixture for elimination of deleterious gum and tar forming substances, and passing the filtered vapors into the flash zone to increase the vaporization of the bituminous oil.

11. A process such as claimed in claim 1, in which the contact mass is subjected to oxidizing reaction to produce mainly carbon monoxide and hydrogen, and the cracked products of the steam distillation are contacted with the products of the oxidizing reaction.

12. Apparatus for the separation of vapor from liquids comprising a tower, a liquid pool retaining means disposed substantially above the bottom of said tower for maintaining constantly a substantial pool of liquid in circulatory turbulent motion, a plurality of ports in said retaining means arranged to control a flow of a portion of said substantial pool of liquid from said retaining means to the bottom of said tower and to control the period of time said portion of liquid is maintained in the turbulent pool to secure the utmost vaporization and separation of low boiling point fractions from liquids, and means for continuously injecting into the liquid on said liquid retaining means a hot fluid comprising mainly of vapor and liquid in such a manner to impart the circulatory turbulent motion to the liquid pool in said retaining means and to continuously replace said portion of liquid flowing constantly to the bottom of said tower.

ERNEST A. OCON.